United States Patent

[111] 3,593,855

| [72] | Inventor | Regis R. Stana<br>Pittsburgh, Pa. |
|---|---|---|
| [21] | Appl No | 824,115 |
| [22] | Filed | May 13, 1969 |
| [45] | Patented | July 20, 1971 |
| [73] | Assignee | Westinghouse Electric Corporation<br>Pittsburgh, Pa. |

[54] HIGH FLOW POROUS REVERSE OSMOSIS MEMBRANES CONTAINING LIPIDS
5 Claims, 6 Drawing Figs.

[52] U.S. Cl. ................................................... 210/500
[51] Int. Cl. ..................................................... B01d 39/00, B01d 13/00
[50] Field of Search ........................................ 210/22, 23, 321, 500

[56] References Cited
UNITED STATES PATENTS

| 3,276,996 | 10/1966 | Lazare | 210/22 |
| 3,423,491 | 1/1969 | McLain et al | 210/500 X |
| 3,483,282 | 12/1969 | Manjkian | 210/500 X |

OTHER REFERENCES

" Investigation and Preparation of Polymer Films to Improve the Separation of Water and Salts in Saline Water Converstion," OFFICE OF SALINE WATER R&D REPORT No. 69; Dec 1962; pp. 1— 13 relied on; 65 pages. Distributed by U.S. Dept. of Commerce, Office of Technical Services.

" The Mechanism of Desalination by Reverse Osmosis," OSW REPORT No. 117; received in Patent Office 6/4/1965, 79 pages; pp. 1, 28, 29, 36 and 37 relied on.

*Primary Examiner*—Frank A. Spear, Jr.
*Attorneys*—F. Shapoe and Alex Mich, Jr.

ABSTRACT: A semipermeable membrane containing a supportive layer and a lipid containing osmotic skin layer of polymeric film forming cellulosic material is made by (1) admixing film forming cellulosic material, solvent, swelling additive and lipid to provide a casting solution (2) casting a film from the solution (3) drying the film (4) leaching the film to form a semipermeable osmotic skin membrane containing a residue of lipid, and (5) optionally curing the membrane.

PATENTED JUL 20 1971 3,593,855

WITNESSES
Helen M. Farkas
Daniel P. Cillo

INVENTOR
REGIS R. STANA
BY Alex Much, Jr.
ATTORNEY

HIGH FLOW POROUS REVERSE OSMOSIS MEMBRANES CONTAINING LIPIDS

BACKGROUND OF THE INVENTION

The reverse osmosis method of water purification, employing cellulose acetate membranes, offers promise in solving the problem of purifying waste waters economically. The issues of water shortage and pollution are of growing concern in the United States and throughout the world. The next few decades may well see the demand for water in the United States exceed its supply. Therefore, there is a pressing need for the commercialization of an economic method of water purification to supply new population and industry demands.

The investigations of Breton and Reid at the University of Florida revealed that cellulose acetate was an excellent film forming material for semipermeable membranes. Loeb, at the University of California modified the preparation of these membranes by incorporating aqueous magnesium perchlorate in an acetone solution of cellulose acetate.

These standard membranes will only reject 10 to 30 percent of the dissolved solids in water fed through a reverse osmosis system, but this may be improved by curing the membranes in a hot water bath at temperatures up to 190° F. The higher curing temperature gives the higher rejections; however, the higher the rejection, the lower the flux of purified product through the membrane. A membrane which gives 30 gal./sq. ft.-day at 20 percent rejection will only give 1—2 gal./sq. ft.-day at 95 percent rejection of impurities.

This low flux at high rejection is one reason why reverse osmosis has not yet become a full commercial development. The problems of increased purified water flux at high rejection rates for cured membranes and improving rejection and flux for uncured membranes, so that it would be possible to use low temperature plastics for membrane cell supports, have heretofore been unsolved.

SUMMARY OF THE INVENTION

Accordingly, it is an object of this invention to provide improved reverse osmosis semipermeable membranes, adapted to permit the rejection of dissolved impurities in a solution, having dense osmotic skins containing lipids for use in tubular or other type reverse osmosis systems.

It is another object of this invention to provide a new and improved method for fabricating these semipermeable membranes wherein lipids are incorporated into the dense osmotic skin of the membrane.

Briefly, these objects are accomplished by (1) using glycerol ester lipids in a cellulose acetate, acetone, formamide casting solution within a critical weight percent range (2) casting this casting solution to form a film (3) air-drying the cast film within a critical air-dry time range (4) immersing the cast film in an ice water leaching bath to form a semipermeable osmotic skin membrane and (5) optionally curing the membrane in a hot water bath up to about 200° F.

My semipermeable lipid containing membranes can be used for applications on tap water for use as water softener and taste improvement, sea water and brackish water for desalination applications, waste effluents for waste impurity disposal, and urea water for biological applications. I have found that my lipid containing membranes exhibit up to two times the flux, at a given solute rejection and pressure, as standard unmodified cellulose acetate membranes. They also can give an increase in solute rejection by the initial uncured membrane.

BRIEF DESCRIPTION OF THE DRAWINGS

For a better understanding of the nature and objects of the invention, reference may be had to the following drawings in which.

DESCRIPTION OF THE PREFERRED EMBODIMENTS

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrate solution, then the solvent can be caused to flow into the more dilute solution. The names "reverse osmosis," "pressure osmosis" and "hyperfiltration" are used to describe this process. A detailed analysis of this phenomenon can be found in u. Merten, *Desalination by Reverse Osmosis*, M.I.T. Press, 1966.

Figure 1:
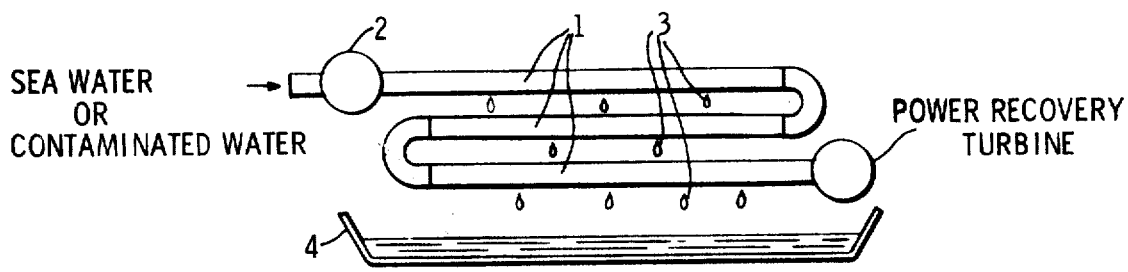
FIG. 1 is a diagram showing the principle for extracting fresh water from sea or contaminated water utilizing a tubular reverse osmosis system.

FIG. 1 illustrates a typical tubular-type reverse osmosis system. Sea water or contaminated water is pumped through a battery of support tubes 1. The pump 2 must exert a pressure greater than the osmotic pressure of the feed and can operate as high as 4000 p.s.i. The tubes can be mounted in batteries of about 150 each. They serve to support the reverse osmosis membrane contained within the tube wall.

The tube walls that support the reverse osmosis membranes must be able to withstand the pressure exerted on them by the pump and must be able to allow egress of the pure water 3 into a collecting pan 4. For sea water several stages of this type may be required before the water is usable.

Suitable support modules both for tubular and flat plate reverse osmosis systems are well known and can be used with the semipermeable lipid containing reverse osmosis membranes of my invention.

An interesting peculiarity of semipermeable cellulose acetate reverse osmosis membranes is that they will only reject salt or other solute impurities if one particular side is in contact with the contaminated water or other feed. The cellulose acetate osmotic skin layer of the membrane is extremely thin, about 0.2 microns thick and has minute foraminous passageways through it as shown schematically in FIG. 2 of the drawings. It is very dense and is the side that is effective in holding back the dissolved impurities in the feed. The remainder of the membrane structure contains a spongy porous cellulose acetate sublayer material that accounts for about 99.8 percent of the membrane's thickness. Its function is mainly supportive.

The process by which the dense osmotic skin of cellulose acetate does its job is complex. One theory is that the polymer has strong hydrogen bonding groups that enhance the bonding of water. The molecules of water migrate from one hydrogen bond site to the next within this dense osmotic skin layer through the minute foraminous passageways. After this effusion through the active osmotic skin layer, they recombine and flow through much more porous cellulose acetate supportive layer as shown in FIG. 2 of the drawings.

The exact mechanism by which the lipids (mixtures of saturated and unsaturated esters of glycerol) affect the membrane characteristics is not precisely known at this time. The lipids are surface active with respect to the water-membrane interface and thus, even though they are generally insoluble in water, they are attracted to the water interface. From physical examination of the cast semipermeable membranes that contain lipids, it is evident that the lipids are concentrated on the dense osmotic skin side. Membranes cast from solutions not containing a lipid appear about the same on either side whereas membranes containing a lipid appear glossy on the osmotic skin side. This is particularly apparent in the dried membranes where the osmotic skin side has a slippery oily feeling.

Figure 2:
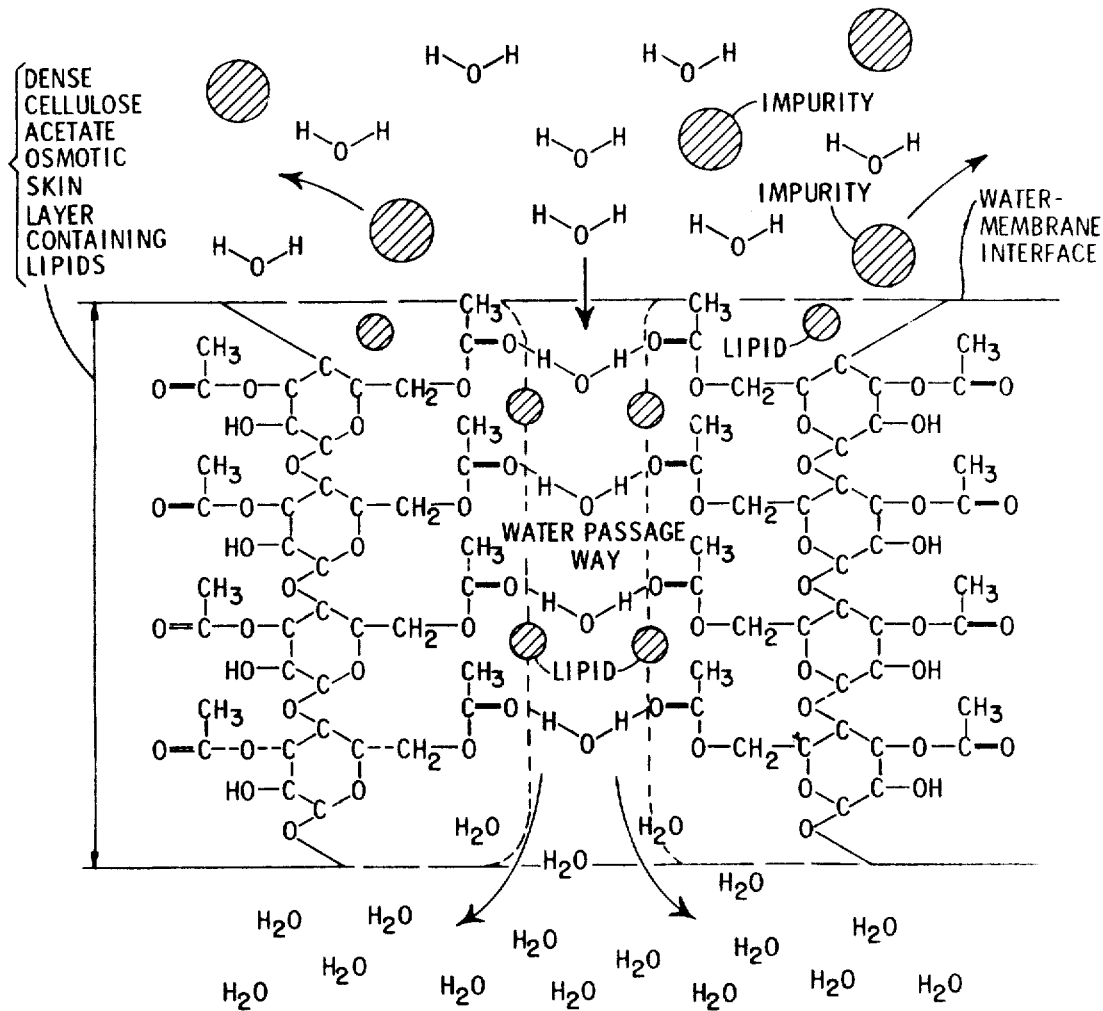
FIG. 2 illustrates one theory of water effusion and rejection of solute impurities for a semipermeable membrane containing a dense osmotic skin layer of polymeric film forming cellulosic material having a plurality of foraminous passageways in its structure and containing lipids in an amount to effect improvement in rejection of impurities.

It is thought that rejection of dissolved impurities in the water or other feed is improved, with the use of effective amounts of these charged lipid groups, by their concentration at the surface of the osmotic skin and in the plurality of foraminous water passages through the osmotic membrane skin, as shown in FIG. 2. It is thought that the lipids line the surface and passages through the osmotic skin, lining up in an electrical double layer at the water-membrane interface and giving the lining of the minute passageways a more negative charge. This negative charge allows effusion of neutrally charged molecules through the membrane while rejecting charged ions. Since these lipid molecules can be fairly small compared to cellulose acetate, they are fairly mobile and as a result only a small concentration may be needed to cover all the water interfaces. Although the exact mechanism is not precisely known, it is known that effective amounts of lipid incorporated into the osmotic skin layer give superior membranes.

In the method of my invention a polymeric film forming cellulosic material such as a cellulosic ether or ester derivative is dissolved in a volatile solution, containing lipids solvents and swelling additives, capable of causing the structural organization of a dense osmotic membrane skin from the cellulosic ether or ester. Preferably the solvent is acetone, the swelling additive is formamide and the cellulosic derivative is cellulose acetate. The lipid must constitute at least 0.1 wt. percent of the casting solution. The casting solution is then cast as a film in flat or cylindrical form and a portion of the casting solution is allowed to evaporate during an air-dry time ranging from 0 to about 120 seconds, causing a dense osmotic skin to develop at the air-solution interface. The cast film is then immersed in a leaching bath containing a leaching solvent such as water where the organic solvent and swelling agent pass through the osmotic skin into the leaching bath and the water from the bath passes into the membrane. The semipermeable membrane may then be cured causing the cellulose acetate to shrink, presumably reducing the size of the foraminous passageways through the osmotic skin and allowing the molecules to align themselves in a regular pattern so as to have all the negative groups lining the passageways. Feed water containing dissolved solids is applied to the high density lipid containing osmotic skin side of the semipermeable membrane under pressure and purified water is recovered from the opposite side.

It is also possible to incorporate the necessary lipid into the semipermeable membrane in an amount to effect improvement in rejection of impurities and the effusion of water through the membrane by first casting a suitable membrane from a casting solution not containing any lipid constituent, and then applying or incorporating the lipid to the osmotic skin of the membrane, as for example, by painting on a lipid solution.

The polymeric film-forming cellulosic ether or ester material derivative that can be used in the method of this invention can have the general formula:

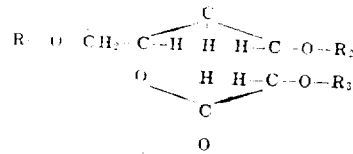

wherein $R_1$, $R_2$, and $R_3$ are members of a group consisting of H, $R_4$ and $CR_5O$ where H is hydrogen, $R_4$ is an alkyl group containing one to eight carbon atoms and $R_5$ is an alkyl group containing one to seven carbon atoms. Specific examples of such polymeric film forming materials are cellulose acetate, cellulose acetate-butyrate, cellulose propionate and ethyl cellulose.

The preparation of such materials is well known in the art. Cellulose acetate, the preferred polymeric film-forming cellulosic material, can be prepared by first converting cellulose into the triacetate in the presence of acetic anhydride, acetic acid and sulfuric acid. Partial hydrolysis removes some of the acetate groups, degrades the chains to smaller fragments (of 200—300 units each) and yields cellulose acetate. Detailed description of preparation and structures of these cellulose ethers and cellulose esters can be found in Brydson, *Plastics Materials*, D. Van Nostrand, PP 356—376, (1966).

The volatile casting solution used in the present invention contains solvents and pore producing swelling additives adapted to permit the structural organization of the osmotic skin from a film forming material by evaporation and leaching of the carrier solution. Preferably the casting solution contains a pore producing swelling additive such as formamide (methanamide) $HCONH_2$, triethyl phosphate, tetrahydrofurfuryl phosphate, and an organic solvent, such as acetone, methyl ethyl ketone, ethyl alcohol or methyl alcohol.

The swelling additive is one which will not dissolve the cellulose acetate but is compatible with it. Others would include aqueous magnesium perchlorate and similar materials.

The lipids most useful in this invention are esters of carboxylic acids. These esters are derived from glycerol ($HOCH_2CHOHCH_2OH$) and hence are known as glycerides. The basic structure of these glycerol ester lipids is shown below:

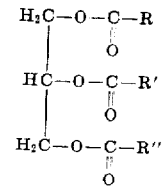

wherein R, R', R'' are each alkyl groups containing one to 20 carbons and preferably one to eight carbons. These glycerol ester lipids are mixed glyceryl esters of various saturated and unsaturated, straight chain, even-numbered carbon acids. The most abundant saturated acids are the straight chain even-numbered carbon acids: caprylic ($CH_3(CH_2)_6COOH$), capric ($CH_3(CH_2)_8COOH$), lauric ($CH_3(CH_2)_{10}COOH$), myristic ($CH_3(CH_2)_{12}COOH$), palmitic ($CH_3(CH_2)_{14}COOH$), and stearic ($CH_3(CH_2)_{16}COOH$). The common unsaturated acids are oleic ($CH_3(CH_2)_7CH=CH(CH_2)_7COOH$), linoleic ($CH_3(CH_2)_4CH=CHCH_2CH=CH(CH_2)_7COOH$), and linoleic $CH_3CH_2CH=CHCH_2CH=CHCH_2CH=CH(CH_2)_7COOH$). The major constituents of the glycerol ester lipids are the acids, which represent up to 90 percent of their weight.

Examples of the acid composition of some glycerol ester lipids are given in Table 1 and Table 2 below:

TABLE 1

| Glycerol ester lipid | Percent saturated acids | | | Percent unsaturated acids | |
| --- | --- | --- | --- | --- | --- |
| | $C_{12}$ | $C_{16}$ | $C_{18}$ | One double bond $C_{18}$ | Two double bonds, $C_{18}$ |
| Triacetin | 100 | | | | |
| Olive oil | | 7—29 | 1—3 | 1—3 | 53—86 | 4—22 |
| Cottonseed oil | | 17—2 | 1—3 | | 23—44 | 34—55 |
| Corn oil | | ≲10 | 1—4 | | 30—50 | 34—56 |

TABLE 2

| Glycerol ester lipid | Percent fatty acids | | | |
|---|---|---|---|---|
| | Acetic | Palmitic and stearic | Oleic | Linoleic |
| Triacetin | 100 | | | |
| Olive oil | | 10 | 83 | 7 |
| Cottonseed oil | | 27 | 19 | 54 |

The preferred glycerol ester lipid is triacetin (triacetate glycerol):

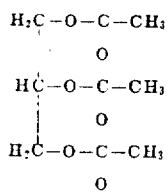

because of its complete solubility in the casting solution. This lipid can be formed by the reaction of acetic acid and glycerol:

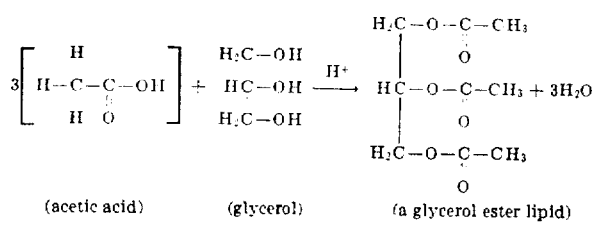

(acetic acid)   (glycerol)    (a glycerol ester lipid)

Further details on the composition and synthesis of glycerol ester lipids is readily available and can be found in Gilman, *Organic Chemistry-An Advanced Treatise*, John Wiley and Sons, Vol. 3, Chapter 3, 1953, and Fieser and Fieser, *Advanced Organic Chemistry*, Reinhold Pub., Chapter 30, 1961, herein consists by reference. It was found that as little as 0.1 wt. percent lipid in the casting solution was effective in producing increased membrane rejection and although good membranes have been produced at about 4 wt. percent, improvement tapers off at concentrations above about 2.5 wt. percent.

Figure 3:
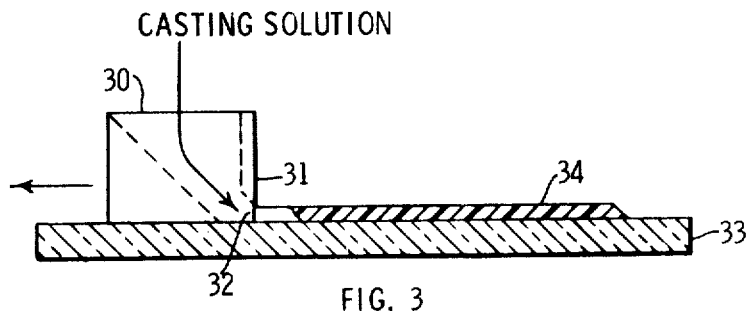
FIG. 3 is a cross-sectional illustration of a casting apparatus used in the experiments.

The experimental equipment consisted of a film sheet casting apparatus, film tube casting apparatus, a leaching bath, a high pressure test loop for testing either tubular of flat membranes and a trap water test loop using the tap water line pressure, the film membrane casting apparatus used in the examples is shown in FIG. 3 and consists of a hollow container 30 into which the casting solution is poured. One side of this container has a blade 31 which adjusts the height of a hole 32 extending along the length of the container. The casting solution flows through the hole and onto the glass plate 33, as the container is moved, to form the cast film 34. The leaching bath consists of a bottom tank where an ice water mixture is kept, and a pair of top water trays to which the ice water from the bottom tank is constantly circulated. The film tube casting apparatus was designed to be able to cast 4-foot long tubes and at the same time be able to control the casting rate, membrane thickness, air-dry time, flow of leaching water past the membrane and leaching time. The high pressure loop used a Mayno pump that could collection up to 2 gallons per minute at pressures up to 500 p.s.i.g. Feed water for this system consisted of 5000 p.p.m. sodium chloride solution. The tap water loop used laboratory tap water at 70—80 p.s.i.g. and 100—200 p.p.m. (parts per million) dissolved solids as a feed.

Figure 4:
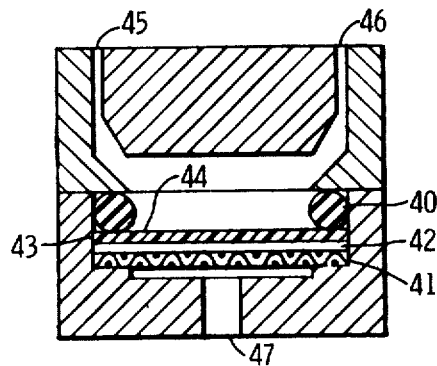
FIG. 4 is a cross-sectional illustration of one of the membrane cells used in testing the semipermeable membranes of this invention.

The membrane cells used for testing flat membranes were of the standard type and used Type 304 stainless steel or plexiglass as construction materials. Round cells were used for testing 1.0 inch diameter membranes. This cell, used in the examples, is shown in FIG. 4 of the drawings. The feed water side seal is made with a rubber "O" ring 40. The product side collection consisted of fine stainless steel wire cloth 41 covered with two layers of paper 42, with the paper contacting the cast semipermeable membrane 43 having an osmotic skin 44. Feed water is fed in opening 45, which is angled to distribute the water, and out opening 46. Purified water is removed through opening 47.

EXAMPLE 1

A casting solution was prepared having the following composition:

9 oz.   43.2 wt. percent   cellulose acetate
5 oz.   24.1 wt. percent   acetone
6 oz.   28.9 wt. percent   formamide (methanamide)
25 ml.  3.8 wt. percent    olive oil (glycerol ester lipid having an acid composition of about 10 percent palmitic and stearic acids, 83 percent oleic acid and 7 percent linoleic acid.)

The solid cellulose acetate was added to the other liquid ingredients to give a viscous liquid solution. This viscous casting solution was poured into the film casting apparatus, heretofore described and shown in FIG. 3 of the drawings, containing a blade with an opening of 12 mils. The casting apparatus was 1 ft. long and it was hand drawn across a 1'×1' glass plate in 5 seconds to give a cast film about 10"×10". The casting was allowed to air-dry for another 55 seconds to give an air-dry time of about 60 sec. Both the glass plate and the casting apparatus were at room temperature. No effort was made to increase the normal laboratory air circulation during the air-dry time. The glass plate and casting were then immersed in a leaching bath prepared from a mixture of tap water and crushed ice. After 20 minutes the semipermeable membrane casting 12 mils thick was separated from the glass plate. The osmotic skin side appeared glossy. A small sample 1" diameter was cut out of the uncured semipermeable membrane and mounted in a standard stainless membrane cell heretofore described and shown in FIG. 4 of the drawings.

Tap water containing 100 p.p.m. dissolved solids was fed into the membrane cell against the osmotic skin side of the membrane at 80 p.s.i. The uncured semipermeable membrane operated at 86 percent rejection of dissolved solids with a purified water flux of 2.5 gal./sq. ft.-day.

EXAMPLE 2

A casting solution was prepared having the following composition:

5 oz.   25.7 wt. percent   cellulose acetate
9 oz.   46.2 wt. percent   acetone
5 oz.   25.7 wt. percent   formamide (methanamide)
15 ml.  2.4 wt. percent    cottonseed oil (glycerol ester lipid having an acid composition of about 27 percent palmitic and stearic acids, 19 percent oleic acid and 54 percent linoleic acid)

The solid cellulose acetate was added to the other liquid ingredients to give a viscous liquid solution. This viscous casting solution was poured into the film casting apparatus, heretofore described and shown in FIG. 3 of the drawings, containing a blade with an opening of 12 mils. The casting apparatus was 1 ft. long and it was hand drawn across a 1'×1' glass plate in 5 seconds to give a casting about 10"×10". The casting was allowed to air-dry for another 55 seconds to give an air-dry time of about 60 seconds. Both the glass plate and the casting apparatus were at room temperature. No effort was made to increase the normal laboratory air circulation during the air-dry time. The glass plate and casting were then immersed in a leaching bath prepared from a mixture of tap water and crushed ice. After 20 minutes the semipermeable membrane casting 12 mils thick was separated from the glass plate. The osmotic skin side appeared glossy. A small sample of the uncured semipermeable membrane 1" diameter was then cut out and set aside.

The remaining uncured semipermeable membrane was immersed in a 154° F. water curing bath for 10 minutes. A small sample of the semipermeable membrane 1" diameter was then cut out and set aside.

The remaining semipermeable membrane was immersed in a 160° F water curing bath for 10 minutes. A small sample of the semipermeable membrane 1 inch diameter was then cut out and set aside These three semipermeable membranes (uncured, 154° F. cured and 160° F. cured) were then mounted in the standard stainless membrane cells heretofore described and shown in FIG. 4 of the drawings.

Tap water containing 100 p.p.m. dissolved solids was fed into the membrane cells against the osmotic skin side of the membrane at 80 p.s.i.

The uncured semipermeable membrane operated at 62 percent rejection of dissolved solids with a purified water flux of 9.2 gal./sq. ft.-day.

The 154° F. cured semipermeable membrane operated at 78 percent rejection of dissolved solids with a purified water flux of 4.4 gal./sq. ft.-day.

The 160° F. cured semipermeable membrane operated at 85 percent rejection of dissolved solids with a purified water flux of 2.7 gal./sq. ft.-day

EXAMPLE 3

Three casting solutions were prepared having the following compositions:

SOLUTION A

| | | |
|---|---|---|
| 4.5 oz. | 21.8 wt. percent | cellulose acetate |
| 10.0 oz. | 48.7 wt. percent | acetone |
| 6.0 oz. | 29.2 wt. percent | formamide (methanamide) |
| 2 ml. | 0.3 wt. percent | triacetin (triacetate glycerol) |

SOLUTION B

| | | |
|---|---|---|
| 5 oz. | 23.6 wt. percent | cellulose acetate |
| 10 oz. | 47.4 wt. percent | acetone |
| 6 oz. | 28.4 wt. percent | formamide (methanamide) |
| 5 ml. | 0.6 wt. percent | triacetin (triacetate glycerol) |

SOLUTION C

| | | |
|---|---|---|
| 5 oz. | 25.0 wt. percent | cellulose acetate |
| 9 oz. | 45.0 wt. percent | acetone |
| 6 oz. | 30.0 wt. percent | formamide (methanamide) |

This casting solution contained no lipid, but is regarded as an excellent high rejection casting solution for semipermeable reverse osmosis membranes.

This example will illustrate the superiority of (membranes containing lipids over membranes) not containing lipids but having comparable wt. percent basic starting ingredients, in tests under identical laboratory conditions.

The solid cellulose acetate was added in all three cases to the other liquid ingredients to give a viscous liquid solution. Each of these viscous casting solutions were poured into film casting apparatus, heretofore described and shown in FIG. 3 of the drawings, containing a blade with an opening of 6 mils. The casting apparatus was 1 foot long and in all three cases it was hand drawn across a 1'X1' glass plate in 5 seconds to give three castings each about 10"X12". All three castings were allowed to air-dry for another 5 seconds to give an air-dry time of about 10 seconds for each of the three castings. Then each glass plate and casting was immersed in a leaching bath prepared from a mixture of tap water and crushed ice. After 20 minutes the three semipermeable membrane castings 6 mils thick were separated from their respective glass plates. The osmotic skin sides of the Solution A and B membranes appeared glossy. A small sample of each of the uncured semipermeable membranes, 1 inch diameter was then cut out and set aside.

SOLUTION A MEMBRANE

The remaining uncured semipermeable membrane cast from SOLUTION A was immersed in a 145° F. water curing bath for 10 minutes. A small sample of the semipermeable membrane 1 inch diameter was then cut out and set aside.

The remaining semipermeable membrane was immersed in a 170° F. water curing bath for 10 minutes. A small sample of the semipermeable membrane 1 inch diameter was then cut out and set aside.

The same procedure was followed to get samples of semipermeable membranes cured at 180° F. and 190° F.

SOLUTION B MEMBRANE

The remaining uncured semipermeable membrane cast from SOLUTION B was immersed in a 160° F. water curing bath for 10 minutes. A small sample of the semipermeable membrane 1 inch diameter was then cut out and set aside.

The remaining semipermeable membrane was immersed in a 174° F. water curing bat for 10 minutes. A small sample of the semipermeable membrane 1 inch diameter was then cut out and set aside.

The same procedure was followed to get samples of semipermeable membranes cured at 180° F. and 190° F.

SOLUTION C MEMBRANE

The remaining uncured semipermeable membrane cast from SOLUTION C was immersed in a 160° F. water curing bath for 10 minutes. A small sample of the semipermeable membrane 1 inch diameter was then cut out and set aside.

The remaining semipermeable membrane was immersed in a 174° F. water curing bath for 10 minutes. A small sample of the semipermeable membrane 1 inch diameter was then cut out and set aside. The same procedure was followed to get samples of semipermeable membranes cured at 180° F. and 190° F.

This gave five SOLUTION A MEMBRANE samples (uncured, 145° F. cure, 170° F. cure, 180° F. cure and 190° F. cure) five SOLUTION B MEMBRANE samples (uncured, 160° F. cure, 174° F. cure, 180° F. cure and 190° F. cure) and five SOLUTION C MEMBRANE samples (uncured, 160° F. cure, 174° F. cure, 180° F. cure and 190° F. cure).

These 15 semipermeable reverse osmosis membranes were then mounted in the standard stainless membrane cells heretofore described and shown in FIG. 4 of the drawings. In all cases both the glass plate and the casting apparatus were at room temperature. No effort was made to increase the normal laboratory air circulation during the air-dry time. In all cases the air-dry time was about 10 seconds and the membrane thickness was 6 mils.

Figure 5:
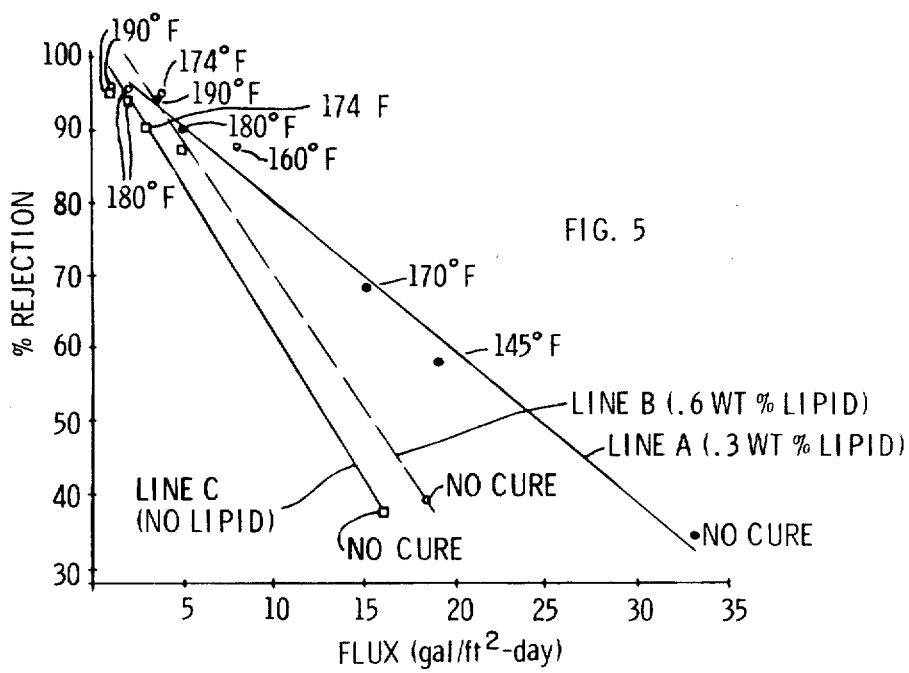
FIG. 5 is a graph comparing performance of semipermeable membranes containing lipids with those not containing lipids.

In all cases tap water containing 100 p.p.m. dissolved solids was fed into the respective membrane cells against the osmotic skin sides of the membranes at 80 p.s.i. The comparative results are shown in FIG. 5, a graph of purified water flux vs. percent rejection of dissolved solids in the tap water feed. Line A represents the performance of the semipermeable membranes cast from Casting SOLUTION A which contained 0.3 wt. percent glycerol ester lipid (triacetin). Line B represents the performance of the semipermeable membranes cast from Casting SOLUTION B which contained 0.6 wt. percent glycerol ester lipid (triacetin). Line C represents the performance of the semipermeable membranes cast from Casting SOLUTION C which contained no lipid. Each point on the lines represents performance at a given cure temperature indicated on the graph.

As can be seen from FIG. 5, the uncured semipermeable membranes containing lipids give from 1.15 to two times the flux of the uncured semipermeable membrane with no lipids, at the same percent rejection. At 160° F. cure the semipermeable membrane containing 0.6 wt. percent lipids gave 1.6 times the flux of the uncured semipermeable membrane with no lipids, at the same percent rejection.

EXAMPLE 4

A casting solution was prepared having the following composition:

| | | |
|---|---|---|
| 5 oz. | 24.7 wt. percent | cellulose acetate |
| 9 oz. | 44.6 wt. percent | acetone |
| 6 oz. | 29.7 wt. percent | formamide (methanamide) |
| 5 ml. | 1.0 wt. percent | triacetin (triacetate glycerol) |

The solid cellulose acetate was added to the other liquid ingredients to give a viscous liquid solution. This viscous casting solution was poured into the film casting apparatus, heretofore described and shown in FIG. 3 of the drawings, containing a blade with an opening of 7 mils. The casting apparatus was 6" long and it was hand drawn across a 6"×4'6" glass plate in 50 seconds. The casting was allowed to air-dry for another 10 seconds. Both the glass plate and the casting apparatus were at room temperature. No effort was made to increase the normal laboratory air circulation during the air-dry time. The glass plate and casting were then immersed in a leaching bath prepared from a mixture of tap water and crushed ice. After 20 minutes the semipermeable membrane casting 6 mils thick was separated from the glass plate. The osmotic skin side appeared glossy. From this semipermeable membrane samples could be taken having air-dry times varying from 10—60 seconds. Four 1 inch diameter samples were cut from the uncured semipermeable membrane corresponding to about 10 seconds air-dry time (from the very end of the casting) 20 seconds air-dry time, 30 seconds air-dry time (from the center of the casting) 40 seconds air-dry time and 50 seconds air-dry time.

The remaining semipermeable membrane was immersed in a 160° F. water curing bath for 10 minutes. Three 1 inch diameter samples were cut from the semipermeable membrane corresponding to about 15, 20 and 30 seconds air-dry time.

All seven of these semipermeable membranes were mounted in standard stainless membrane cells heretofore described and shown in FIG. 4 of the drawings.

Figure 6:
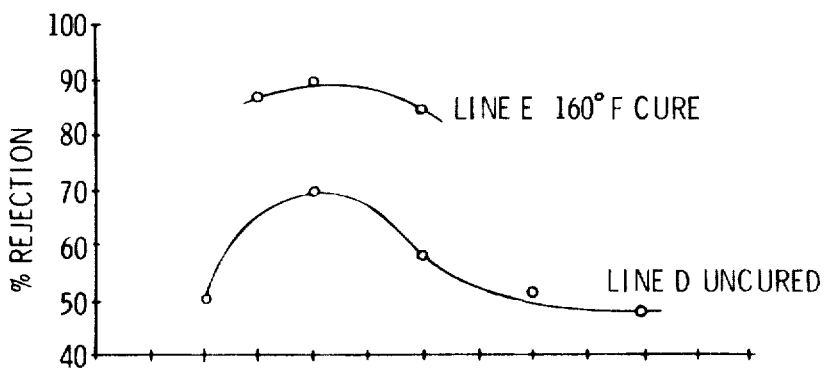
FIG. 6 shows graphs of air-dry time versus flux and air-dry versus percent rejection rates of a semipermeable membrane containing lipids.
Figure 6:
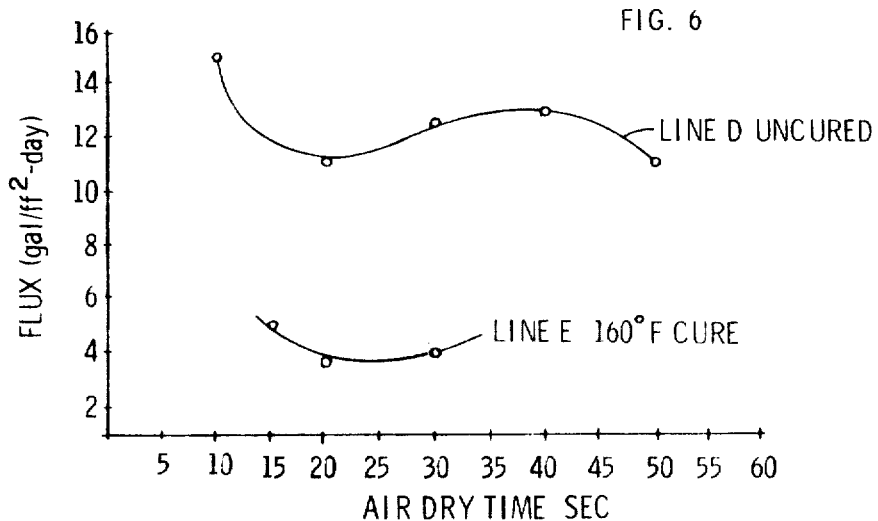

Tap water containing 100 p.p.m. dissolved solids was fed into the respective membrane cells against the osmotic skin sides of the membranes at 80 p.s.i. The results are shown in FIG. 6, a graph of air-dry time vs. purified water flux and percent rejection of dissolved solids in the tap water feed. Line D represents the performance of the uncured semipermeable membranes. Line E represents the performance of the cured semipermeable membranes.

As can be seen from FIG. 6, for this particular casting solution composition, excellent flux and rejection rates are achieved at air-dry times between about 10—30 seconds. Other casting solution compositions such as those in EXAMPLES 1 and 2 indicate that a 60 second air-dry time will produce excellent membranes and there is no reason to believe that air-dry times of up to about 2 minutes will not produce good semipermeable membranes.

In all of my membranes, after the acetone and formamide have been evaporated and leached out, the residue of lipid remaining in the polymeric film forming cellulosic material will be in the weight percent ratio of lipid to polymeric film forming cellulosic material of about 0.005 to 1 to about 0.09 to 1.

Although the examples have used the preferred ingredients in the casting solutions, it is felt that any semipermeable membrane or method of fabricating a semipermeable membrane wherein an amount of lipid effective to increase rejection of impurities in the feed is incorporated in the osmotic skin of the membrane, is within the scope of this invention.

I claim as my invention:

1. A semipermeable membrane of polymeric film forming cellulosic material adapted to permit the effusion of water and the rejection of dissolved impurities therein, containing a thin, dense osmotic skin layer of polymeric film forming cellulosic material, the osmotic skin layer having a plurality of foraminous passageways through its structure, the osmotic skin layer containing lipids dispersed throughout in an amount to effect improvement in the rejection of impurities, the lipids being concentrated at the surface of the osmotic skin and in the plurality of foraminous passageways through the osmotic skin structure, the lipids being present within the membrane in the weight percent ratio of lipid to polymeric film forming cellulosic material of about 0.005 to 1 to about 0.09 to 1.

2. The semipermeable membrane of claim 1 wherein the polymeric film forming cellulosic material is selected from the group consisting of cellulose esters and cellulose ethers and the lipids are glycerol ester lipids.

3. The semipermeable membrane of claim 2 wherein the polymeric film forming cellulosic material is selected from the group consisting of cellulose acetate, cellulose acetate-butyrate, cellulose propionate and ethyl cellulose and the glycerol ester lipid has the formula

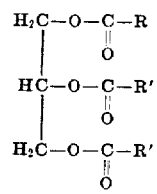

wherein R, R' and R" are alkyl groups containing one to eight carbons.

4. The semipermeable membrane of claim 3 wherein the glycerol ester lipid is triacetin.

5. The semipermeable membrane of claim 3 wherein the membrane is cured to reduce the size of the foraminous passageways.